Dec. 8, 1953
A. E. MURRAY
2,662,164
ILLUMINATING MEANS FOR MUSICAL
SCORE SUPPORTING DEVICES
Filed April 11, 1951
2 Sheets-Sheet 1
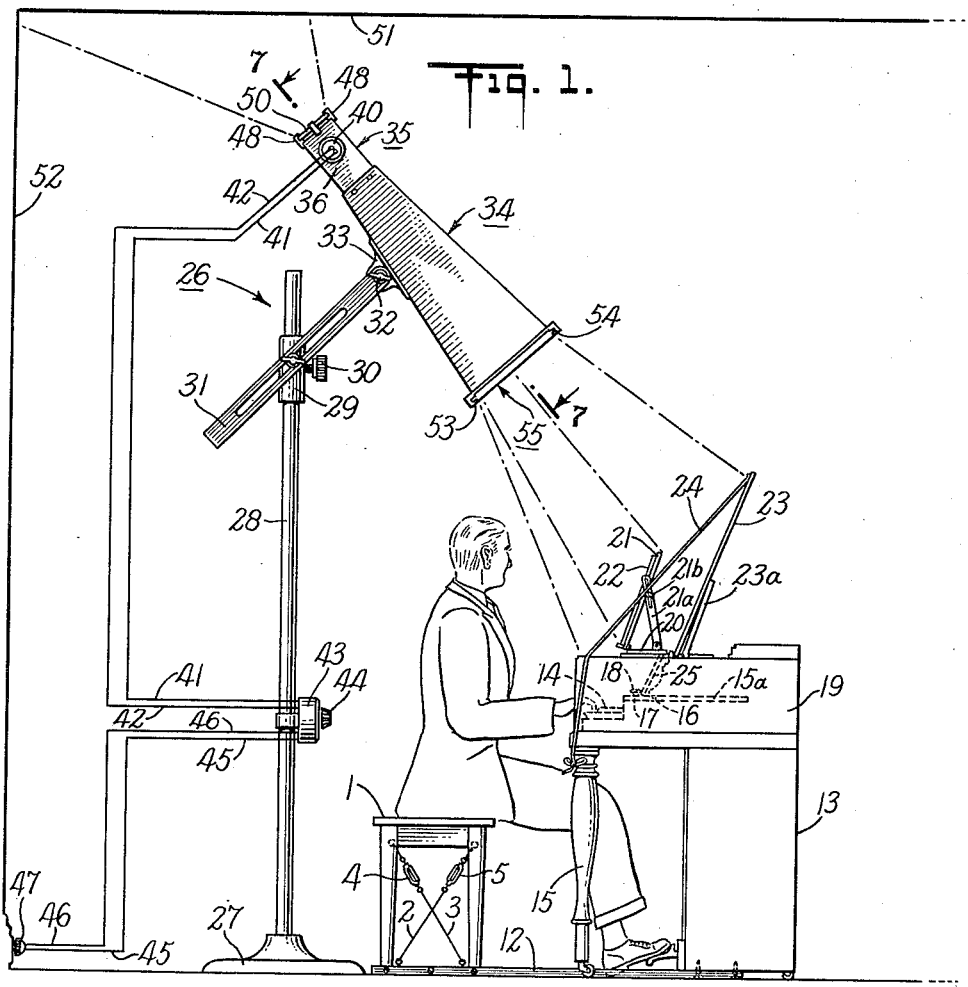
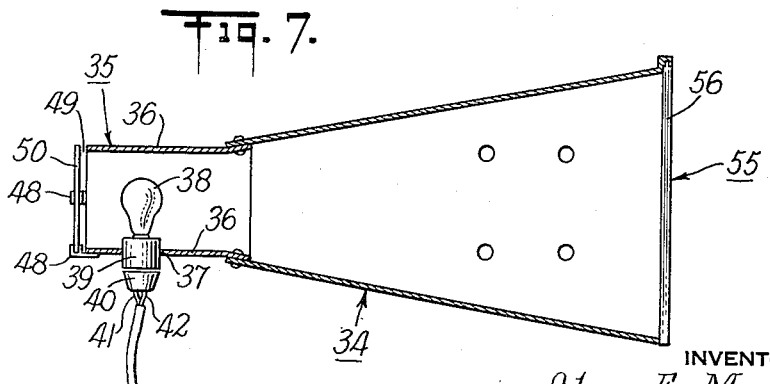
INVENTOR
Alan E. Murray
BY
ATTORNEY Dec. 8, 1953                    A. E. MURRAY                    2,662,164
ILLUMINATING MEANS FOR MUSICAL
SCORE SUPPORTING DEVICES
Filed April 11, 1951                                  2 Sheets—Sheet 2
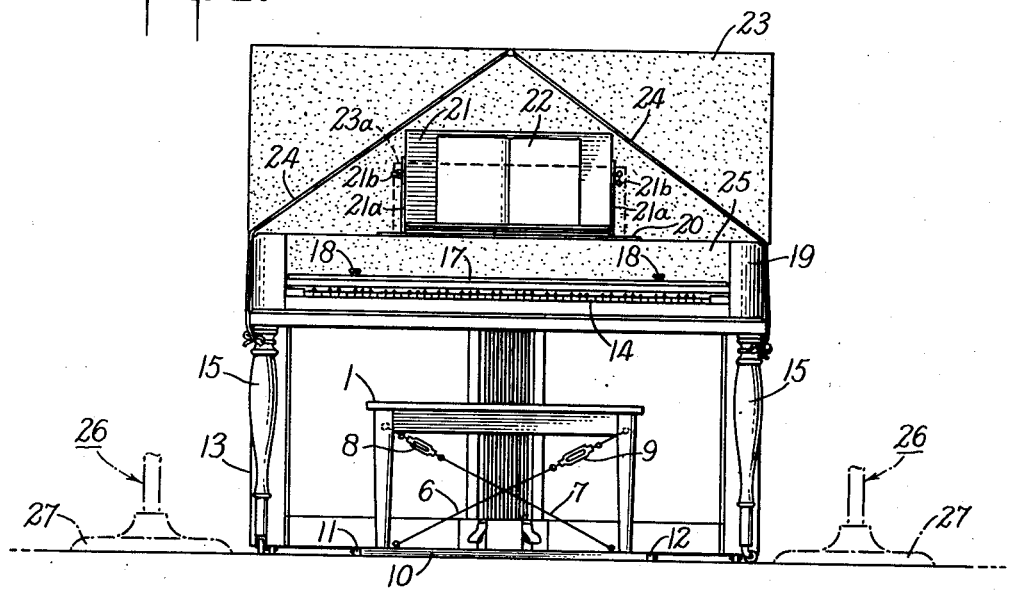
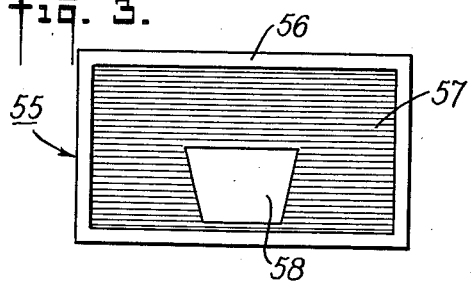
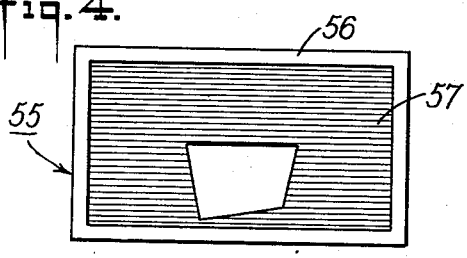
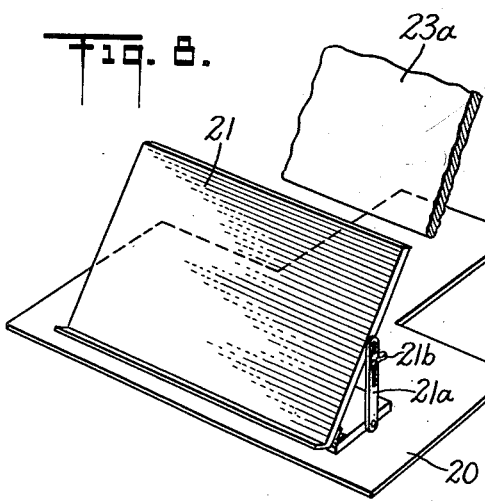
INVENTOR
*Alan E. Murray*
BY
*Arthur Wright*
ATTORNEY Patented Dec. 8, 1953

2,662,164

UNITED STATES PATENT OFFICE 2,662,164

ILLUMINATING MEANS FOR MUSICAL SCORE SUPPORTING DEVICES

Alan E. Murray, New York, N. Y.

Application April 11, 1951, Serial No. 220,455

6 Claims. (Cl. 240—4)

1

My invention relates particularly to means for illuminating areas forming the subject of concentrated attention, as for example in reading from musical scores or when reading or studying subject matter of any desired kind.

The object of my invention is to provide effective and adequate means for illuminating musical scores during musical performance thereof or otherwise and for the study of any desired subject matter which is to be illuminated while reading or examining the same. A further object is to attain the desired and correct relative illumination of not only the areas forming the subject of concentrated attention but also the area surrounding or adjacent to the subject area as well as the illumination generally of the confining area, such as the ceiling or wall, or both, of the room in which the score or other matter to be read or studied is located. Still another object is to attain this effective illumination of the several areas referred to from what is substantially a single light source, for instance a bulb or group of blubs each of which may be of any desired intensity or shape or color, but in such a manner that the several areas referred to may be provided with the different desired intensities of light as well as any different tints or shades of color. Further objects are to provide means for effectively enabling the performer on a musical instrument, such for instance as a piano, to so position and illuminate the score with regard to himself while performing on the instrument, as to free the performer's attention from the mechanical operations, for concentration on the score of music while being read. Still another object is to provide the said effective illumination, both as to intensity and color, in the distribution of the light on the several areas to be illuminated notwithstanding the different positions in which the source of light is to be placed with regard to the position of the musical performer or reader and the musical score or other subject matter. Still further objects of my invention will appear from the detailed description of the same hereinafter.

While my invention is capable of embodiment in many different forms, for the purpose of illustration I have shown only certain forms thereof in the accompanying drawings, in which—

Fig. 1 is a diagrammatic side elevation of a piano showing the score of music which the performer is reading, also the source of light capable of producing the variations of illumination both as to intensity of light and color, as above referred to;

2

Fig. 2 is a front elevation of the piano shown in Fig. 1, as located in the room in which the musical composition is being played;

Fig. 3 is a front elevation of a composite screen for location at the front of the light source, adapted to be used to illuminate the musical score and the surrounding or adjacent area, when the light source shown in Fig. 1 is located immediately to the rear of and above the performer or reader;

Fig. 4 is a view of a screen similar to Fig. 3, but showing the screen as constructed to be used when the light source is to the left and rear of the performer or reader;

Fig. 5 is a similar view to Fig. 4, showing the screen as constructed when placed to the right and rear of the performer or reader;

Fig. 6 is a front elevation of a color screen which may be transparent or opaque, as desired, to be placed at the rear of the light source for illuminating the confining area, such as the ceiling and/or walls of the room;

Fig. 7 is a longitudinal cross-section of the light source; and

Fig. 8 is an enlarged detailed perspective view of the music rest and the inclined bracket.

Referring particularly to Figs. 1 and 2, I have shown a stool or bench 1 to be occupied by the performer while reading a musical score for a piano, the stool having at each side thereof a pair of diagonal wires 2 and 3 with turnbuckles 4 and 5 therein to remove or minimize extraneous vibration of the bench 1. Similarly, behind the bench 1 there are two diagonal wires 6 and 7 with turnbuckles 8 and 9 therein connected to the two sides, respectively, of the bench 1 and to a supporting board or plate 10 on which the bench 1 is, preferably, carried. The two side edges of the plate 10 are fastened by wooden bars 11 and 12 to the underneath portion of a piano 13 by means of any suitable screws, as desired, to maintain a fixed relative location for the bench and to convey musical vibrations from the piano to the body of the performer through the bench 1.

The piano 13 has the usual keyboard 14 supported by legs 15 at the front of the piano. Also, the keyboard 14 is capable of being covered by a horizontal slidable lid 15a connected by a hinge 16 to a front flat 17, which folds downwardly over the keyboard 14 when the lid 15a is moved into forward position. The upper part of the lid 15a has two knobs 18 for sliding the lid forwardly or backwardly into a housing or enclosure 19 carrying the operating parts of the piano in the usual manner. Said enclosure 19 is shown extending somewhat above the level of the keyboard 14. The said piano 13, furthermore, has a music rest 20 having a hinged flap 21 and slotted adjusting links 21a with thumb-screws 21b on the music rest 20 for holding in place, at an angle to the vertical, any desired score of music 22 which is being read during the playing of the piano. Behind the score 22 and the music rest 20 I, preferably, support a large inclined black sheet of cardboard or any other desired material 23, on an inclined bracket 23a having a non-reflecting velvety or matt surface. However, the cardboard sheet 23 may be of any other desired color. The said cardboard sheet 23 is, preferably, slightly wider than the piano 13 so as to cut off reflection from the piano, and may have a white downwardly and forwardly inclined cord 24 fastened to the upper middle part of the sheet 23, above the middle of the keyboard 14, and by its ends to the two legs 15 of the piano, to give perspective to the score of music 22. In front of and below the cardboard sheet 23 there is provided a similar sheet of carboard 25 which may be black or of any other color, but having a non-reflecting velvety or matt surface. This is preferably narrower than the width of the cardboard sheet 23 and so located that its lower edge rests behind the knobs 18 and immediately above the keyboard 14.

The cardboard sheets 23 and 25, thus, obscure or cut off from view substantially all of the upper portions of the piano which would normally reflect light to the performer and which would otherwise contribute to the distraction of his attention from the score 22.

In order to illuminate the score and the surrounding or adjacent areas, including the keyboard, which are to be made visible in the desired relative degrees of intensity during the playing of the piano, I have provided a lamp 26, which comprises a floor base 27, having a standard or upright 28 thereon provided with a sliding sleeve 29 having a hand screw 30 for fastening the sleeve 29 in any desired position of vertical adjustment. It will be understood, of course, that this base 27 may be placed immediately in the rear of the seat 1, in Fig. 3, or it may be placed elsewhere, as for instance to the left and rear of the seat 1 as in Fig. 4, or to the right and rear of said seat 1 as in Fig. 5. In fact, when the lamp is being used for reading or studying subject matter other than in connection with the operation of a musical instrument, the base 27 may be so positioned similarly with regard to the reader. Pivotally attached to one side of the sleeve 29 there is a slotted arm 31 which has a pivotal connection, by means of a thumb screw 32, to a bracket 33 fastened to the side of a truncated pyramidal opaque light-collecting substantially non-reflecting enclosure 34, which is preferably made of wood and which is secured by rivets, or otherwise, to a hollow lamp housing 35 rectangular in cross-section, open at both ends, and having four walls 36, through one of which there is a hole 37 to receive a light bulb 38 of any desired intensity, color or tint. The bulb 38 has a light socket 39 at the outside of said wall arranged to receive a pull-out plug 40 of the usual character and which is connected by wires 41 and 42 to a rheostat 43 with a manually operable switch arm 44 to vary the intensity, from the light of the bulb 38, the rheostat being connected by wires 45 and 46 to a wall plug 47 capable of being attached to the house circuit. The hollow lamp housing is preferably made of metal with internal light reflecting surfaces to avoid undue loss of light. At their upper ends two of the said four walls 36 are provided with spring catches 48 to hold in place therein, but so as to leave an open space 49, an upper screen 50 (see Fig. 6) which may be smooth and opaque to reflect colored or white light into the enclosure 34, but which is preferably transparent and of any desired color so as to transmit light of the desired color and intensity to a ceiling 51 or one or more of enclosing walls 52.

At the lower end of the enclosure 34 there is provided a pair of slots 53 and 54 into which there may be slid, from one side or the other of the enclosure 34, a lower screen 55 made with a metal frame 56 having fastened over the same a translucent layer of tracing cloth 57 which may be white or of any other desired color. In the central portion of the tracing cloth 57 there may be cut out therefrom a central area 58 onto which there is fastened at the edges by any desired adhesive a transparent or, if desired, translucent window of a plastic of any desired color or tint for projecting the light from the lamp onto the score 22 or other subject to be intensively studied while the surrounding or adjacent area, the keyboard and the black cardboard sheets 23 and 25, receive the light from the tracing cloth 57. The window 58 is preferably in the form of a symmetrical inverted trapezium, as shown in Fig. 3, when the lamp is placed directly at the rear of the performer or reader, but will be asymmetrical, as shown in Fig. 4, when placed at the left rear of the performer or reader, or asymmetrical in the other direction, as shown in Fig. 5, when placed to the right rear of the said performer or reader. The purpose of these particular shapes of the window 58 is to provide for the fact that the enclosure 34 is generally directed at an angle from above or laterally to the position of the score 22, so that when the light from the area 58 reaches the score it will be substantially rectangular in shape and conforming approximately to the size and shape of the score 22 to attain uniformity of illumination of the notes of the score, etc.

This illumination of the score from the window 58 may be of any desired tint or intensity, depending upon the wishes of the performer and depending upon the tint and intensity of the light source or lamp 38. Usually, the light from the lamp bulb 38 will not be white but generally yellowish and ofttimes yellowish with a tinge of red in the light, and if the performer or reader wishes to derive therefrom, for instance, a white or whiter light on the score 22 he will choose, preferably, a greenish or bluish screen 58 therewith. However, as before stated, the color of this window may be determined from a choice of screens 55 which may be provided having windows 58 of different colors and tints in combination with the tracing cloth 57 of a varied selection of colors and tints as well as intensities. The choice of the screen 55 for these many combinations of the many different variable colors and tints will be determined, also, somewhat by the particular screen 50, whether opaque or transparent, as well as its intensity of light transmission or reflection or both, the choice of which screen 50 is also determined largely by what intensity or tint is to be transmitted to the ceiling 51 or walls 52 of the room from the illumination thereof in which the performer or reader is located. In other words, any desired colors or tints or variations in intensity of light may be provided for the three different illumination areas, that is to say the score 22, the keyboard and cardboard sheets 23 and 25 and the enclosing areas 51 and 52 of the room, merely from the single light source 38 which itself may be varied in color or tint or intensity by the rheostat 43.

In this way an enormous variation and choice of intensities of colors or tints of the three respective light areas 22, 23—25 and 51—52 may be obtained and this can be accomplished merely, and with an almost infinite variation of the relative light values, with a single light source 38 and its upper and lower screens 50 and 55. Not only is this possible, but the same desired uniformity of results can be obtained notwithstanding the position into which the lamp may be shifted with regard to the player of the instrument or reader, laterally or longitudinally.

While I have described my invention above in detail I wish it to be understood that many changes may be made therein without departing from the spirit of the same. For instance, either the window 58 or cloth 57, or both taken together, with the screen 50 may be of the same or any desired complementary colors respectively. Such combinations of colors may, for instance, be a blue or green window 58 with a yellow or red screen 50, or vice versa, the cloth 57 being white or the same, but a darker, tint as the window 58.

I claim:

1. In combination, an inclined illuminating means comprising a source of light, a reflecting light housing open at both ends, an open-ended light transmitting enclosure connected thereto, a light-reducing screen for receiving light and delivering a modified form of said light from said housing and non-reflecting light-transmitting enclosure, and a similarly inclined musical score supporting device together with a larger dark-background sheet spaced away therefrom, both of which are adapted to be illuminated through the screen.

2. In combination, an inclined illuminating means comprising a source of light, a reflecting light housing open at both ends above and below, an open-ended light transmitting enclosure connected thereto, a light-reducing screen for receiving light and delivering downwardly a modified form of said light from said housing and non-reflecting light-transmitting enclosure, a second light-transmitting screen located above the upper open end of the light housing, and a similarly inclined musical score supporting device together with a larger dark-background sheet spaced away therefrom, both of which are adapted to be illuminated through the first mentioned screen.

3. In combination, an inclined illuminating means comprising a source of light, a reflecting light housing open at both ends, an open-ended light transmitting enclosure connected thereto, a light-reducing screen, having a central transparent window and an adjacent translucent area of lower light transmitting intensity, for receiving light and delivering a modified form of said light from said housing and non-reflecting light-transmitting enclosure, and a similarly inclined musical score supporting device together with a larger dark-background sheet spaced away therefrom, both of which are adapted to be illuminated through the screen.

4. In combination, an inclined illuminating means comprising a source of light, a reflecting light housing open at both ends above and below, an open-ended light transmitting enclosure connected thereto, a light-reducing screen, having a central transparent window and an adjacent translucent area of lower light transmitting intensity, for receiving light and delivering downwardly a modified form of said light from said housing and non-reflecting light-transmitting enclosure, a second light-transmitting screen located above the upper open end of the light housing, and a similarly inclined musical score supporting device together with a larger dark-background sheet spaced away therefrom, both of which are adapted to be illuminated through the first mentioned screen.

5. In combination, an inclined illuminating means comprising a source of light, a reflecting light housing open at both ends, an open-ended light transmitting enclosure connected thereto, a light-reducing screen for receiving light and delivering a modified form of said light from said housing and non-reflecting light-transmitting enclosure and a similarly inclined musical score supporting device adapted to be illuminated through the screen, said device comprising also a non-reflecting background.

6. In combination, an inclined illuminating means comprising a source of light, a reflecting light housing open at both ends above and below, an open-ended light transmitting enclosure connected thereto, a light-reducing screen for receiving light and delivering downwardly a modified form of said light from said housing and non-reflecting light-transmitting enclosure, a second screen located above the upper open end of the light housing, and a forwardly inclined cord giving a sense of perspective near a musical score position extending on both sides away from the lower portion of the score position.

ALAN E. MURRAY.

References Cited in the file of this patent

UNITED STATES PATENTS

| Number | Name | Date |
|---|---|---|
| 925,086 | Furniss | June 15, 1909 |
| 1,048,983 | Madden | Dec. 31, 1912 |
| 1,270,269 | Davis | June 25, 1918 |
| 1,273,580 | Cohen | July 23, 1918 |
| 1,417,935 | Mitchell | May 30, 1922 |
| 1,709,626 | McGunnigle | Apr. 16, 1929 |
| 2,310,509 | Brandt | Feb. 9, 1943 |